United States Patent [19]
Tokunaga et al.

[11] Patent Number: 4,970,121
[45] Date of Patent: Nov. 13, 1990

[54] MAGNETIC RECORDING MEDIUM

[75] Inventors: Fumihiro Tokunaga; Jun Nakagawa; Tsutomu Okita; Toshio Kawamata; Kazuo Hasumi, all of Kanagawa, all of Japan

[73] Assignee: Fuji Photo Film Co., Ltd., Kanagawa, Japan

[21] Appl. No.: 229,411

[22] Filed: Aug. 8, 1988

[30] Foreign Application Priority Data

Aug. 6, 1987 [JP] Japan .............................. 62-195221
Aug. 20, 1987 [JP] Japan .............................. 62-204985

[51] Int. Cl.$^5$ ............................................. G11B 23/00
[52] U.S. Cl. .................................. 428/412; 428/423.7; 428/425.9; 428/694; 428/695; 428/900
[58] Field of Search ............... 428/900, 694, 423.7, 428/425.9

[56] References Cited
U.S. PATENT DOCUMENTS

| 4,307,154 | 12/1981 | Hosaka et al. | 428/413 |
| 4,568,610 | 2/1986 | Lehner et al. | 428/425.9 |
| 4,652,496 | 3/1987 | Yasufuku et al. | 428/425.9 |
| 4,654,258 | 3/1987 | Kawamata et al. | 428/323 |
| 4,713,293 | 12/1987 | Asano et al. | 428/403 |
| 4,784,907 | 11/1988 | Matsufuji et al. | 428/328 |
| 4,789,583 | 12/1988 | Akutsu | 428/143 |
| 4,820,581 | 4/1989 | Saito et al. | 428/323 |

Primary Examiner—Paul J. Thibodeau
Assistant Examiner—Stevan A. Resan
Attorney, Agent, or Firm—Sughrue, Mion, Zinn, Macpeak & Seas

[57] ABSTRACT

A magnetic recording medium comprising a nonmagnetic support having thereon a magnetic layer comprising ferromagnetic particles dispersed in a binder comprising a mixture of a polycarbonate polyurethane and a phenoxy resin in a weight ratio of from about 1.5:1 to 5:1.

9 Claims, 1 Drawing Sheet

MAGNETIC RECORDING MEDIUM

FIELD OF THE INVENTION

This invention relates to a magnetic recording medium having a magnetic layer having ferromagnetic particles dispersed in a binder, and more particularly it relates to a coated magnetic recording medium having excellent durability.

BACKGROUND OF THE INVENTION

A magnetic recording medium comprising a non-magnetic support having provided thereon a magnetic layer containing ferromagnetic particles, such as ferromagnetic iron oxide or ferromagnetic alloys, dispersed in a binder has conventionally been used as an audio tape, a video tape, a computer tape, a magnetic disk and the like.

With the recent development of technologies in this field, higher density recording and higher efficiencies have been required for a magnetic recording medium. Polyurethane type binders, those binders mixed with other resins, and those binders mixed with a low molecular weight agent which provides lubricating properties are used, particularly to improve wear resistance.

However, when such binders are used, the film strength of a magnetic layer is insufficient, resulting in powder dropping (powder production) which causes dropouts. Heat resistance is also in sufficient. Also, when the binders are used in combination with other resins, their compatibility is not good, and when the binders are used in combination with a low molecular weight compound, blooming occurs, resulting in head clogging of a magnetic head.

To overcome the above problems, it has been proposed to use as a binder polycarbonate polyester polyurethane (disclosed in JP-A-58-60430), and polycarbonate polyurethane (JP-A-59-198530 and 60-13324). (The term "JP-A" as used herein means an "unexamined published Japanese patent application"). It is also known to use phenoxy resins as a durable hard binder, as disclosed in U.S. Pat. No. 4,448,846, and to use fatty acid modified silicone as a lubricating agent to improve wear resistance (as disclosed in JP-B-56-26890). (The term "JP-B" as used herein means an "examined Japanese patent publication").

However, when polyester polyurethane is used as a binder, there is the problem that film strength is decreased. When polycarbonate polyurethane is used as a binder, there is also the problem that durability at a high temperature and a high humidity is relatively deteriorated, even though film strength and durability are improved.

It is proposed in JP-A-61-9830 that polycarbonate polyurethane resins and isocyanate hardening agents be used as a binder to further improve film strength and durability. However, this approach is not satisfactory to improve still durability and to prevent powder dropping.

A phenoxy resin is a hard binder having good durability, but is fragile and brittle, and thus powder is readily produced. Due to its brittleness, durability after repeated running and still durability is insufficient.

It is known to use fatty acid modified silicon in combination with a conventional polycarbonate polyurethane to decrease the dynamic friction coefficient and to improve durability and blooming, but the durability of such media at a high temperature and a high humidity is not sufficient.

Durability can be improved to some extent by using an abrasive agent in combination with a binder, but durability under a high temperature and a high humidity requires further improvement.

SUMMARY OF THE INVENTION

An object of this invention is to provide a magnetic recording medium having improved durability.

Another object of this invention is to provide a magnetic recording medium having improved durability at a high temperature and a high humidity.

Other objects and effects of this invention will be clearly understood from the following description.

It has now been discovered that these objects of the present invention can be attained by providing a magnetic layer containing ferromagnetic particles dispersed in a binder comprising polycarbonate polyurethane which has a low Young's modulus but has good stretching properties, and a phenoxy resin which is brittle but is hard and has good durability.

That is, this invention relates to a magnetic recording medium comprising a non-magnetic support having thereon a magnetic layer comprising ferromagnetic particles dispersed in a binder comprising a mixture of a polycarbonate polyurethane and a phenoxy resin in a weight ratio of from about 1.5:1 to 5:1.

BRIEF DESCRIPTION OF THE DRAWING

The FIGURE illustrates an apparatus for measuring an adhesive strength used in the Examples.

DETAILED DESCRIPTION OF THE INVENTION

Figure 1:
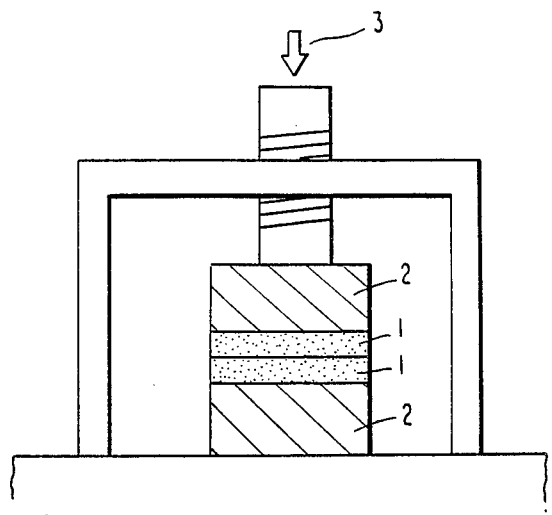

In the magnetic recording medium of this invention, durability at a high temperature and a high humidity can particularly be improved by further incorporating (1) a lubricating agent comprising a fatty acid modified silicone and at least one of a fatty acid ester, a fatty acid amide and an α-olefin oxide, and (2) an abrasive agent having a Mohs' hardness of at least 6 into the magnetic layer.

A phenoxy resin for use in this invention is preferably synthesized from bisphenol A and epichlorohydrin, has the structural formula:

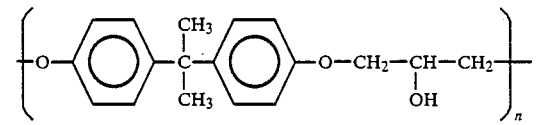

wherein n is from about 50 to 200, and the molecular weight is from about 14,000 to 57,000. Such phenoxy resins are commercially available under the trade name of "PKHH" manufactured by Union Carbide Co., Ltd. and "DER-686" manufactured by Dow Chemical Co., Ltd. The phenoxy resin is preferably used in an amount of from about 5 to 30 wt % based on the total binder.

The polycarbonate polyurethane for use in this invention includes the polycarbonate polyester polyurethane as disclosed in JP-A-58-60430 and polycarbonate polyurethane as disclosed in JP-A-59-198530 and 60-13324.

The polycarbonate polyester polyurethane referred to herein is polyurethane composed of a polyol, a polyisocyanate and an optional chain extending agent preferably having a number average molecular weight of from about 15,000 to 100,000.

The polyol includes a polyester polyol composed of 1,10-decanedicarboxylic acid and a polycarbonate polyol.

The polycarbonate polyol can be prepared by condensing a polyhydric alcohol, phosgene, a chloroformic ester and a dialkylcarbonate or a diallylcarbonate. In the preparation of the polycarbonate polyol, a particularly preferred polyhydric alcohol includes 1,6-hexanediol, 1,4-butanediol, 1,3-butanediol, neopentyl glycol and 1,5-pentadiol.

The polyisocyanate reacted with the polyol includes tolylene diisocyanate, 4,4'-diphenylmethane diisocyanate, xylene diisocyanate, 1,5-naphthylene diisocyanate, hexamethylene diisocyanate, o-tolylne diisocyanate and an adduct product of these isocyanates and an active hydrogen compound.

The optional chain extending agent to be used if necessary includes the above described polyhydric alcohols, an aliphatic polyamine, an alicyclic polyamine and an aromatic polyamine. Examples of the aliphatic polyamine include $H_2NC_6H_{12}NH_2$. Examples of the alicyclic polyamine include:

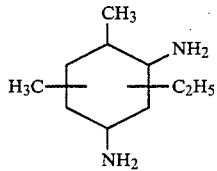

Examples of the aromatic polyamine include:

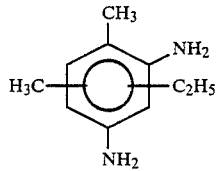

The polycarbonate polyurethane used in this invention includes a polyurethane obtained by urethanated reaction of a polycarbonate polyol and a polyisocyanate. The polycarbonate polyol and polyisocyanate used herein may be the same as those as described above for the polycarbonate polyester polyurethane.

Other polyhydric alcohols and conventionally known chain extending agents as described, e.g., in *Polyurethane Jushi Handbook* (Handbook of polyurethane Resin), by Iwata et al, pp. 122-123 (Nikkan Kogyo Press) can be used in the urethanated reaction.

The polycarbonate polyurethane used in this invention can be prepared by heating in a nitrogen atmosphere the above described polyol and polyhydric isocyanate in the presence of, if necessary, catalysts and a solvent such as an amide, a sulfoxide, a cyclic ether, a ketone or a glycol ether solvent at from 60 to 100° C. for several hours to prepare a prepolymer, and reacting the resulting prepolymer at the same temperature as above for several hours. Examples of the method for preparing the polycarbonate polyurethane include those described in JP-A-58-60430.

The weight ratio of the polycarbonate polyurethane to the phenoxy resin in the binder is from about 1.5:1 to 5:1, preferably from about 1.8:1 to 4:1. In the weight ratio, when the ratio of polycarbonate polyurethane is less than about 1.5, powder dropping increases and still durability is deteriorated. When the ratio of polycarbonate polyurethane is more than about 5, powder dropping increases and still durability is deteriorated.

The binder composed of polycarbonate polyurethane and a phenoxy resin can be used in combination with conventionally used binders for forming a magnetic layer, such as copolymers of vinyl chloride and vinylidene chloride, copolymers of vinyl chloride and vinyl acetate, cellulose resins such as nitrocellulose, acetal resins or acrylonitrile butadiene resins. The amounts of the above conventional binders should be within the range so that the effect of the binder composed of the above described polycarbonate polyurethane and phenoxy resin should not be affected. Preferably, the weight ratio of the binder composed of polycarbonate polyurethane and a phenoxy resin to the conventional binders is in the range of from about 9.5:0.5 to 4:6, more preferably from about 9:1 to 5:5.

A cross-linking agent (hardening agent) can be also used in this invention.

The cross-linking agent include isocyanates such as tolylene diisocyanate, 4,4'-diphenylmethane diisocyanate, hexamethylene diisocyanate, xylylene diisocyanate, naphthylene 1,5-diisocyanate, o-toluidine diisocyanate, isophorone diisocyanate, or triphenylmethane triisocyanate, a product of reaction the above isocyanates with a polyalcohol, and polyisocyanates produced by the condensation reaction of isocyanates.

The amount of the cross-linking agent is preferably from about 5 to 30 wt % based on the total amount of the binder.

The fatty acid modified silicone preferably used in this invention as a lubricating agent includes silicones represented by formulae (I) and (II).

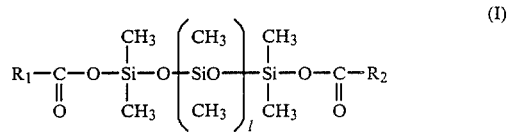

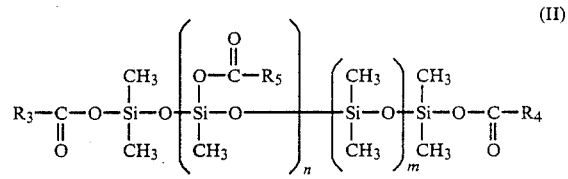

In formula (I), $R_1$ and $R_2$, which may be the same or different, each represents a saturated or unsaturated hydrocarbon group having from 7 to 21 carbon atoms, and l is an integer of from 0 to 50. In formula (II), $R_3$, $R_4$ and $R_5$, which may be the same or different, each represents a saturated or unsaturated hydrocarbon group having from 7 to 21 carbon atoms, and m and n each is an integer of from 0 to 80.

Examples of the silicone represented by formula (I) include capric acid modified silicone (i.e., $R_1$ and $R_2$ each is —$C_7H_{15}$ and l is 2), behenic acid modified silicone (i.e., $R_1$ and $R_2$ each is —$C_{21}H_{43}$ and l is 2), myristic acid modified silicone (i.e., $R_1$ and $R_2$ each is —$C_{13}H_{27}$ and l is 2), and oleic acid modified silicone (i.e., $R_1$ and $R_2$ each is —$C_{17}H_{33}$ and l is 2).

Examples of the silicone represented by formula (II) include oleic acid modified silicone (i.e., $R_3$ and $R_4$ each is —$CH_3$, $R_5$ is —$C_{17}H_{33}$, m is 80, and n is 8), and myristic acid modified silicone (i.e., $R_3$, $R_4$ and $R_5$ each is —$C_{13}H_{27}$, m is 73, and n is 25).

The fatty acid esters which can be used in combination with the above described fatty acid modified silicone include esters such as ethyl stearate, butyl palmitate, hexyl laurate, butyl laurate or butyl myristate, and alkoxyesters such as butoxyethyl stearate, butoxybutyl stearate, ethoxyethyl stearate, ethoxybutyl stearate or butoxyethyl palmitate.

The fatty acid amide which can be used in combination with the above described fatty acid modified silicone includes stearylamide, oleylamide, erucylamide and myristyl amide.

The α-olefin oxide which can be used in combination with the fatty acid modified silicone includes a compound represented by formula (III):

In formula (III), $R_6$ represents an alkyl group having from 10 to 30 carbon atoms.

The fatty acid modified silicon is preferably used in an amount of from about 0.05 to 10 wt %, more preferably from about 0.1 to 5 wt % based on the ferromagnetic particles. The other lubricating agents than the silicone is preferably used in an amount of from about 0.5 to 10 wt %, more preferably from about 0.8 to 7 wt % based on the ferromagnetic particles.

The abrasive agent having a Mohs' hardness of at least 6 optionally used in the magnetic layer of this invention can remarkably improve the durability. Examples thereof include α-alumina (α-$Al_2O_3$), fused alumina, chromium oxide ($Cr_2O_3$), corundum, silicon nitride, boron nitride, silicon carbide, molybdenum carbide, boron carbide and tungsten carbide. The particle diameter thereof is preferably from about 0.03 to 5 μm, more preferably from about 0.05 to 2 μm.

The additive amount of the abrasive agent is preferably from about 0.1 to 20 wt %, more preferably from about 0.3 to 15 wt % based on ferromagnetic particles. When the additive amount of the abrasive agent is less than about 0.1 wt % the effect of this invention decreases, and when it is higher than about 20 wt %, the electromagnetic characteristics decrease.

The ferromagnetic particles which can be used in this invention include γ-$Fe_2O_3$, Co-containing γ-$Fe_2O_3$, $Fe_3O_4$, Co-containing $Fe_3O_4$, γ-$FeO_x$ ($1.33 \leq x \leq 1.50$), Co-containing γ-$FeO_x$, ($1.33 \leq x \leq 1.50$), $CrO_2$, Co-Ni-P alloy, Co-Ni-Fe alloy, Fe-Ni-Zn alloy, Ni-Co alloy, Co-Ni-Fe-Be alloy and tabular hexagonal crystalline barium ferrite. These ferromagnetic particles preferably have an average particle size of from about 0.005 to 2 μm, a ratio of long axis length/axis width of from about 1/1 to 50/1, and a specific surface area of from about 1 to 70 $m^2/g$.

The total amount of the binder in the magnetic layer is preferably from about 15 to 50 wt %, more preferably from about 20 to 40 wt % based on the amount of the ferromagnetic particles.

In the preparation of a magnetic recording medium of this invention, for providing a magnetic layer having ferromagnetic particles dispersed in a binder on a non-magnetic support, a magnetic coating composition is prepared by dispersing ferromagnetic particles in a solution of an organic solvent having dissolved therein a binder, or by mixing ferromagnetic particles and a binder in an organic solvent; and the coating composition is coated on a non-magnetic support to form a magnetic layer. In this instance, other additives, e.g., lubricating agents other than those described above, abrasive agents other than those described above, rust preventing agents, and antistatic agents such as carbon black or graphite may be added to the magnetic coating composition.

The lubricating agents may be added upon preparing a magnetic coating composition, or may be coated or sprayed directly on the surface of a magnetic layer with or without dissolving them in an organic solvent, after drying or smoothing treatment.

Organic solvents used for forming a coating composition include ketones such as acetone, methyl ethyl ketone, methyl isobutyl ketone or cyclohexanone, esters such as methyl acetate, ethyl acetate, butyl acetate, ethyl lactate or monoethyl ether of glycol acetate, glycol ethers such as ether, glycol dimethyl ether, glycol monoethyl ether or dioxane, aromatic hydrocarbons such as benzene, toluene or xylene, and chlorinated hydrocarbons such as methylene chloride, ethylene chloride, carbon tetrachloride, chloroform, ethylene chlorohydrin or dichlorobenzene.

Various mixing and kneading machines can be used for mixing, kneading and dispersing the coating composition containing ferromagnetic particles, binders and other additives, such as a two-roll mill, a ball mill, sand grinder, a disper, a high speed impeller dispersing device, a high speed mixer, or a homogenizer.

The method for coating a magnetic coating composition on a support includes a doctor coating method, a blade coating method, an air knife coating method, a squeeze coating method, a reverse roll coating method and a gravure coating method.

Materials for a non-magnetic support include polyesters such as polyethylene terephthalate or polyethylene-2,6-naphthalate, polyolefins such as polyethylene or polypropylene, cellulose derivatives such as cellulose triacetate, plastics such as polycarbonate, polyimide or polyamide, and non-magnetic metals and non-magnetic alloys such as aluminum, copper, tin or zinc. The thickness of the support is preferably from about 2.5 to 100 μm, more preferably from about 3 to 70 μm.

In the magnetic recording medium of this invention, a backing layer may be provided on the surface of the non-magnetic support opposite to the magnetic layer, and an underlayer may be provided to improve the adhesion of a magnetic layer before providing a magnetic layer.

The magnetic layer has a dry thickness of preferably from about 0.2 to 15 μm.

Upon preparing a magnetic layer, after a magnetic coating composition is coated on a non-magnetic support, magnetic orientation may be accomplished before drying the coating composition. If necessary, calendering treatment can be performed and then the magnetic layer is cut to any desired shape.

As the manufacturing method, the processing method, the materials, etc. of the magnetic recording medium according to the present invention, those described in JP-B-56-26890 may be applied to the present invention.

This invention will now be illustrated in more detail by reference to the following Examples and Comparative Examples, but this invention is not to be constructed as being limited thereto. Unless otherwise indicated, all parts, percents and ratios are by weight.

EXAMPLES 1 TO 3 AND COMPARATIVE EXAMPLES 1 TO 5

A part of the following composition was put in a ball mill, sufficiently mixed and kneaded, and 7 parts of Desmodule L-75 (a trade name of polyisocyanate compound manufactured by Bayer Co., Ltd.) was added thereto and uniformly mixed and dispersed to prepare a magnetic coating composition.

| Composition | |
|---|---|
| Co-containing $\gamma$-$Fe_2O_3$ (specific surface area 30 $m^2/g$) | 100 parts |
| Copolymer of vinyl chloride and vinyl acetate ("VMCH", manufactured by Union Carbide Co., Ltd.) | 12 parts |
| Mixture of polyurethane resin and phenoxy resin ("PKHH", manufactured by Union Carbide Co., Ltd.) as shown in Table 1 | 20 parts in total |
| Carbon black (average particle diameter 120 $\mu$m) | 10 parts |
| $\alpha$-$Al_2O_3$ (average particle diameter 0.38 $\mu$m) | 3 parts |
| Myristic acid modified silicon | 1 part |
| Oleic acid | 1 part |
| Butyl stearate | 1.5 parts |
| Solvent of methyl ethyl ketone/toluene/ tetrahydrofuran (mixing ratio 3/4/3) | 200 parts |
| 4,4'-diphenylmethane diisocyanate | 10 parts |

The viscosity of the magnetic coating composition was adjusted, and the coating composition was coated on a polyethylene terephthalate support having a thickness of 15 $\mu$m, was magnetically oriented, dried and calendered to prepare a sample of Examples 1 to 3.

Regarding the samples, powder production and still durability were evaluated. The results of the evaluation are shown in Table 1.

For comparison, samples having different mixing ratios in the binder (Comparative Examples 1 to 5) were prepared in the same procedure as above and the evaluation on the comparative samples were made in the similar manner as above.

TABLE 1

| | Weight ratio of polyurethane resin to phenoxy resin Polycarbonate polyurethane: Phenoxy resin (PKHH) | Characteristics | |
|---|---|---|---|
| | | Powder dropping* | Still durability |
| Example 1 | 3:1 | A | 60 min. or more |
| Example 2 | 1.5:1 | A | 60 min. or more |
| Example 3 | 5:1 | A | 60 min. or more |
| Comparative Example 1 | 6:1 | | 39 min. |
| Comparative Example 2 | 1:1 | B-C | 35 min. |
| Comparative Example 3 | Only polycarbonate polyurethane | B-C | 35 min. |
| Comparative Example 4 | Only PKHH was used | B-C | 28 min. |
| Comparative Example 5 | 3**:1 | C | 35 min. |

TABLE 1-continued

| | Weight ratio of polyurethane resin to phenoxy resin Polycarbonate polyurethane: Phenoxy resin (PKHH) | Characteristics | |
|---|---|---|---|
| | | Powder dropping* | Still durability |

Note:
*Powder dropping A: No powder adhered to guide B: Spot-like adhesions on guide C: Continuous adhesions coated on guide
**In Comparative Example 5, polyester polyurethane was used instead of the polycarbonate polyurethane.

As clear from the results shown in Table 1, the magnetic recording medium of this invention reduced powder production and had excellent still durability.

EXAMPLES 4 TO 11

A part of the following composition was put in a ball mill, sufficiently mixed and kneaded and the residual part thereof was put in the ball mill, sufficiently mixed and kneaded, 7 parts of Desmodule L-75 (a trade name of a polyisocyanate compound manufactured by Bayer Co., Ltd.) was added thereto and uniformly mixed and dispersed to prepare a magnetic coating composition.

| Composition | |
|---|---|
| Co-containing $\gamma$-$Fe_2O_3$ (specific surface area 30 $m^2/g$) | 100 parts |
| Vinyl chloride and vinyl acetate compound ("VMCH", manufactured by Union Carbide Co., Ltd.) | 12 parts |
| Polyurethane | shown in Table 2 |
| Phenoxy resin ("PKHH", manufactured by Union Carbide Co., Ltd.) | 6 parts |
| Carbon black (average particle diameter 120 m$\mu$) | 10 parts |
| Abrasive agent (average particle diameter 0.45 $\mu$m) | shown in Table 2 |
| Fatty acid modified silicone | shown in Table 2 |
| Fatty acid ester, fatty acid amide or olefin oxide | shown in Table 2 |
| Solvent of MEK/toluene/THF (mixing ratio 3/4/3) | 200 parts |
| Isocyanate compound having the following structure | 10 parts |
| Isocyanate Compound | |

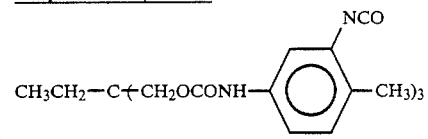

The viscosity of the magnetic coating composition was adjusted and then the coating composition was coated on a polyethylene terephthalate support having a thickness of 15 $\mu$m, magnetically oriented, dried and calendered to prepare a sample of Examples 4 to 11.

The polycarbonate polyurethane used in Example 1 was obtained by the same synthis method as disclosed in Example 1 of JP-A-60-13324, and the polycarbonate polyester urethane was obtained by the same synthesis method as disclosed in Example 1 of JP-A-58-60430.

The following tests of these samples were conducted and the results thereof are shown in Table 3.

Adhesive strength

As shown by the outline drawing of the FIGURE, using a microtablet molding apparatus manufactured by Hitachi Ltd., sample tapes 1 and 1' having an area of 3.18 cm² (i.e., 1.27 cm×2.5 cm) were superposed with the magnetic layers facing each other, and spacers 2 and 2' were applied such that the spacers sandwiched the magnetic layers through glass plates and then pressure with a torque 3 of 60 kg·cm was applied. After they were allowed to stand at 50° C. for 5 hours, the adhesive strength was checked by pulling both tapes horizontally to their surface by a pulling testing device. The unit was kg/3.18 cm².

Gloss on the surface of a magnetic layer

In accordance with Japanese Industrial Standard (JIS) Z8741, gloss was measured and is shown as a relative value when mirror-like gloss on the surface of a gloss having a refractive index of 1.567 at an angle of incidence of 45° C. is 100%.

Squareness ratio

Squareness ratio (Br/Bm) was measured at Hm of 2 KOe using an oscillating sample type fluxmeter (manufactured by Toei Kogyo Co., Ltd.).

Dynamic friction coefficient

The sample tape was guided around a stainless pole at a tension of 50 g ($T_1$), and under this condition, the tension $T_2$ with which the tape was run at a rate of 3.3 cm/s was measured. The friction coefficient $\mu$ of the video tape was calculated from the measured value.

$$\mu = 1/\pi \cdot \ln T_2/T_1$$

Still durability

Screen signals of image signals 501RE were recorded and reproduced in a still mode, and while recording the reproduced RF output level by a recorder, the period of time for the signal levels to decrease to ½ was measured.

Regarding the above tests as to still durability, adhesive strength and friction coefficient, thermo-treated samples (at 60° C. and 80% RH for 7 days) and nonthermo-treated samples were tested to confirm the effect of this invention. In the tests, samples having a high adhesive strength are inferior, because the binder is easily hydrolyzed to form a low molecular compound. The thermotreatment was conducted to accelerate the change with passage of time.

TABLE 2

| | Parts by weight per 100 parts by weight of magnetic particles | | | |
|---|---|---|---|---|
| | Polyurethane | Fatty acid modified silicon | Other lubricating agent | Abrasive agent |
| Example 4 | Polycarbonate polyurethane 10 | Myristic acid modified silicone 1.0 | Butyl palmitate 0.5 | $\alpha$-Al$_2$O$_3$ 1.5 |
| Example 5 | Polycarbonate polyester poly- 10 | Palmitic acid modified silicone 1.5 | Oleic acid amide 0.3 | Cr$_2$O$_3$ 0.5 |
| Example 6 | Polyurethane of Example 4 10 | Oleic acid modified silicone 1.2 | 1,2 epoxy tetradecan 0.5 | $\alpha$-Al$_2$O$_3$ 0.3 |
| Example 7 | Polyurethane of Example 4 10 | Myristic acid modified silicone 2.0 | Butyl palmitate/ butoxyethyl stearate 3/5 | $\alpha$-Al$_2$O$_3$ 5 |
| Comparative Example 6 | Polyester polyurethane (manufactured by Goodridge Co., Ltd. 10 Esten 5701) | Myristic acid modified silicone 1.0 | Butyl palmitate 0.5 | $\alpha$-Al$_2$O$_3$ 1.5 |
| Comparative Example 7 | Polyurethane of Example 4 10 | none | Butyl palmitate 0.5 | $\alpha$-Al$_2$O$_3$ 1.5 |
| Comparative Example 8 | Polyurethane of Example 4 10 | none | Butyl palmitate 1.5 | $\alpha$-Al$_2$O$_3$ 1.5 |
| Comparative Example 9 | Polyurethane Example 4 10 | Myristic acid modified silicone 1.0 | Butyl palmitate 1.5 | none |

TABLE 3

| | Squareness ratio | Gloss | Adhesive strength (nonthermo/ thermo treated) (kg/cm²) | Friction coefficient (nonthermo/ thermo-treated) | Still durability (nonthermo/ thermo-treated) |
|---|---|---|---|---|---|
| Example 4 | 0.85 | 200 | 0.2/0.25 | 0.30/0.33 | 60'</60'< |
| Example 5 | 0.85 | 185 | 0.25/0.30 | 0.32/0.35 | 60'</60'< |
| Example 6 | 0.83 | 188 | 0.25/0.25 | 0.33/0.34 | 60'</60'< |
| Example 7 | 0.84 | 180 | 0.15/0.15 | 0.30/0.33 | 60'</60'< |
| Example 8 | 0.82 | 185 | 2.0/0.3 | 0.35/0.55 | 45'/25' |
| Example 9 | 0.83 | 180 | 0.25/0.3 | 0.60/0.93 | 40'/15' |
| Example 10 | 0.85 | 170 | 0.3/0.3 | 0.33/0.33 | 11'/5' |
| Example 11 | 0.84 | 175 | 0.25/0.3 | 0.31/0.34 | 45'/18' |

As clear from the results shown in Table 3, durability (still durability) at a high temperature and a high humidity was further improved when a magnetic layer of a magnetic recording medium of this invention contained a predetermined lubricating agent and an abrasive agent having a Mohs' hardness of at least 6.

It is also clear that both squareness ratio and gloss of a magnetic recording medium of this invention were nearly the same as those of conventional magnetic recording medium and that adhesive strength and friction coefficient were low and unchanged even at a high temperature and a high humidity.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a nonmagnetic support having thereon a magnetic layer comprising ferromagnetic particles dispersed in a binder comprising a mixture of a polycarbonate polyurethane and a phenoxy resin in a weight ratio of from about 1.5:1 to 5:1, wherein said magnetic layer further comprises (1) a lubricating agent containing a fatty acid modified silicone and at least one of a fatty acid ester, a fatty acid amide and an α-olefin oxide and (2) an abrasive agent having a Mohs' hardness of at least 6.

2. A magnetic recording medium as claimed in claim 1, wherein said phenoxy resin has a molecular weight of from about 14,000 to 57,000 and is represented by the following formula:

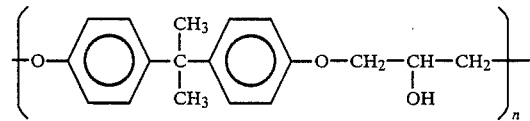

wherein n represents an integer of from 50 to 200.

3. A magnetic recording medium as claimed in claim 1, wherein said binder contains from about 5 to 30 wt % of said phenoxy resin.

4. A magnetic recording medium as claimed in claim 1, wherein said polycarbonate polyurethane is a polycarbonate polyester polyurethane of a polyester polyol and a polyisocyanate.

5. A magnetic recording medium as claimed in claim 1, wherein said fatty acid modified silicone is represented by formula (I) or (II):

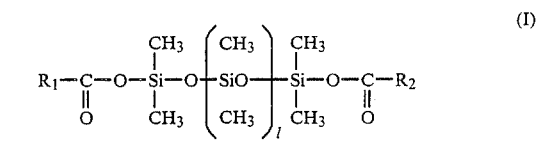

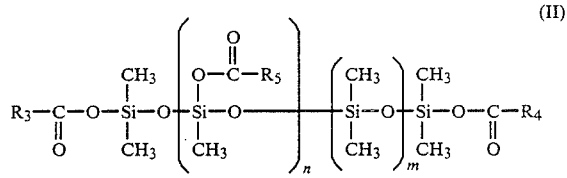

wherein $R_1$ and $R_2$, which may be the same or different, each represents a saturated or unsaturated hydrocarbon group containing from 7 to 21 carbon atoms; l represents an integer of from 0 to 50; $R_3$, $R_4$ and $R_5$, which may be the same or different, each represents a saturated or unsaturated hydrocarbon group containing from 7 to 21 carbon atoms; and m and n, which may be the same or different, each represents an integer of from 0 to 80.

6. A magnetic recording medium as claimed in claim 1, wherein said fatty acid ester is selected from ethyl stearate, butyl palmitate, hexyl laurate, butyl laurate, butyl myristate, butoxyethyl stearate, butoxybutyl stearate, ethoxyethyl stearate, ethoxybutyl stearate and butoxyethyl stearate; said fatty acid amide is selected from stearylamide, oleylamide, erucylamide and myristylamide; and said α-olefin oxide is represented by formula (III):

wherein $R_6$ represents an alkyl group containing from 10 to 30 carbon atoms.

7. A magnetic recording medium as claimed in claim 1, wherein said fatty acid modified silicone is present in an amount of from about 0.05 to 10 wt % based on the amount of said ferromagnetic particles; and said fatty acid ester, said fatty acid amide and α-olefin are present in an amount of from about 0.5 to 10 wt % based on the amount of said ferromagnetic particles.

8. A magnetic recording medium as claimed in claim 1, wherein said magnetic layer contains from about 15 to 50 wt % of said ferromagnetic particles.

9. A magnetic recording medium as claimed in claim 1, wherein said abrasive agent is present in an amount of from about 0.1 to 20 wt % based on the amount of said ferromagnetic particles.

* * * * *